(12) United States Patent
Rix et al.

(10) Patent No.: US 8,007,189 B2
(45) Date of Patent: Aug. 30, 2011

(54) RAPID DEPLOYMENT SURVEILLANCE SYSTEM

(75) Inventors: John Fred Rix, Tucson, AZ (US); Benjamin Green, Tucson, AZ (US)

(73) Assignee: IPVISION, Inc., Tucson, AZ (US)

( * ) Notice: Subject to any disclaimer, the term of this patent is extended or adjusted under 35 U.S.C. 154(b) by 45 days.

(21) Appl. No.: 12/347,817

(22) Filed: Dec. 31, 2008

(65) Prior Publication Data

US 2010/0166412 A1     Jul. 1, 2010

(51) Int. Cl.
*G03B 17/00*     (2006.01)
(52) U.S. Cl. ........................................ 396/427
(58) Field of Classification Search .................. 396/427
See application file for complete search history.

(56) References Cited

U.S. PATENT DOCUMENTS

| 5,065,249 | A | * | 11/1991 | Horn et al. | 348/376 |
| 5,604,551 | A | * | 2/1997 | Choi et al. | 396/58 |
| 5,786,854 | A | * | 7/1998 | Slade et al. | 348/373 |
| 2004/0047624 | A1 | * | 3/2004 | Sugiura et al. | 396/427 |
| 2005/0151846 | A1 | * | 7/2005 | Thornhill | 348/149 |
| 2005/0179539 | A1 | | 8/2005 | Hill et al. | 340/539.1 |
| 2007/0052804 | A1 | * | 3/2007 | Money et al. | 348/143 |
| 2007/0183772 | A1 | * | 8/2007 | Baldwin et al. | 396/439 |
| 2008/0240837 | A1 | * | 10/2008 | Green | 400/693 |
| 2009/0086043 | A1 | * | 4/2009 | Scheucher | 348/211.4 |

* cited by examiner

*Primary Examiner* — Rodney Fuller
(74) *Attorney, Agent, or Firm* — Hayes Soloway P.C.

(57) ABSTRACT

A portable surveillance system for rapid deployment, comprising a hardware case containing a battery, a processor, a hard disk drive, and a means for communications; at least one surveillance camera; and a tripod. The tripod is used to support both the camera and the hardware case. The hardware case is weatherproof, having intake and exhaust fans and optional electric heating and/or cooling units. The present invention is capable of being transported and positioned quickly by a single operator in a desired location.

10 Claims, 2 Drawing Sheets

RAPID DEPLOYMENT SURVEILLANCE SYSTEM

FIELD OF THE INVENTION

The present invention relates generally to a portable surveillance system. The invention has particular utility in providing surveillance in locations where a conventional network and server is not feasible, and/or where a temporary surveillance installation is needed, and will be described in connection with such utilities, although other utilities are contemplated.

BACKGROUND OF THE INVENTION

Security systems are widely used to protect property and provide safety. Generally, such security systems may provide such features as surveillance and alarm activation systems. Some security systems are remotely monitored. Most security systems are limited in scope to providing security to a well-defined area, such as, for example, a structure or a defined set of structures, and are part of a substantially permanent installation.

Others have attempted to provide portable security systems to protect a defined area. Some prior art examples even provide remote users with the capability of surveying conditions at a secured site in real-time, obtaining stored monitoring data relating to the site, and changing security and monitoring protocols at the site.

For example, U.S. Publication No. 2005/0179539 describes a rapid deployment security system that may be operated from a remote location, having a data storage subsystem, surveillance cameras, a power supply, GPS positioning, and various communication capabilities. However, the system is large, being secured to a trailer that is transported by a vehicle, and is not optimized for extreme weather conditions. Sometimes, however, the most advantageous surveillance position is not reachable by motor vehicle.

Also, temporary surveillance may need to be set up for special events, concerts, political rallies, etc., in locations that generally have no permanent surveillance systems in place, such as public parks, etc. Temporary surveillance also may be needed to supplement in place surveillance systems when higher degree of security is desired.

Accordingly, a need still exists for a security system that is portable and rapidly deployable which still provides the functionality of conventional permanent security systems from any desired location, and that can withstand extreme weather conditions.

SUMMARY OF THE INVENTION

To address the requirements described above, the present invention provides a portable security system for rapid deployment, wherein the required hardware, including battery power, data storage, processor, and communications equipment, are contained in a single, portable, weatherproof case, equipped, if required, for heating and/or cooling the contents of the case. The case is capable of being carried by a single operator and suspended from a tripod, to which one or more surveillance cameras may be attached. The present invention is therefore capable of being deployed in a broad range of environments with minimal setup required.

BRIEF DESCRIPTION OF THE DRAWINGS

Further features and advantages of the present invention will be seen from the following detailed description, taken in conjunction with the accompanying drawings, wherein, like numerals depict like parts, and wherein.

DETAILED DESCRIPTION OF PREFERRED EMBODIMENTS

In the following description, reference is made to the accompanying drawings, which form a part hereof, and in which is shown, by way of illustration, various embodiments of the present invention. It is understood that other embodiments may be utilized and changes may be made without departing from the scope of the present invention.

Figure 1:
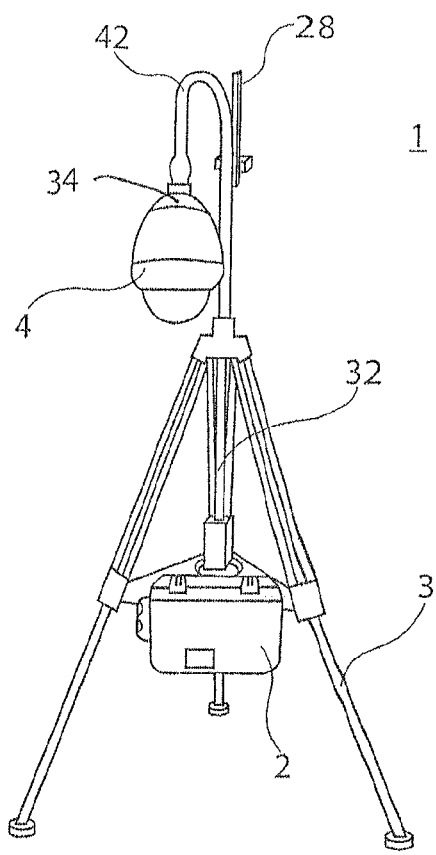
FIG. 1 is an illustration of a portable surveillance system fully assembled and deployed, in accordance with the present invention.
Figure 2:
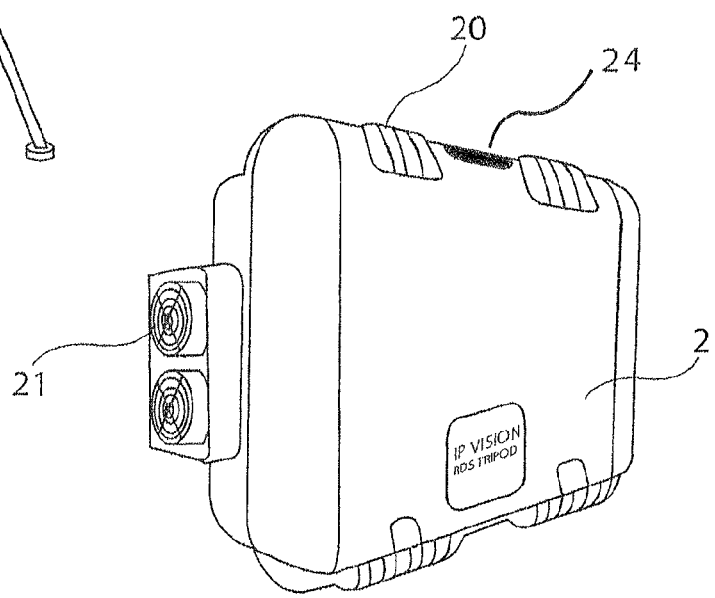
FIG. 2 is an illustration of a hardware case in accordance with the present invention.
Figure 3:
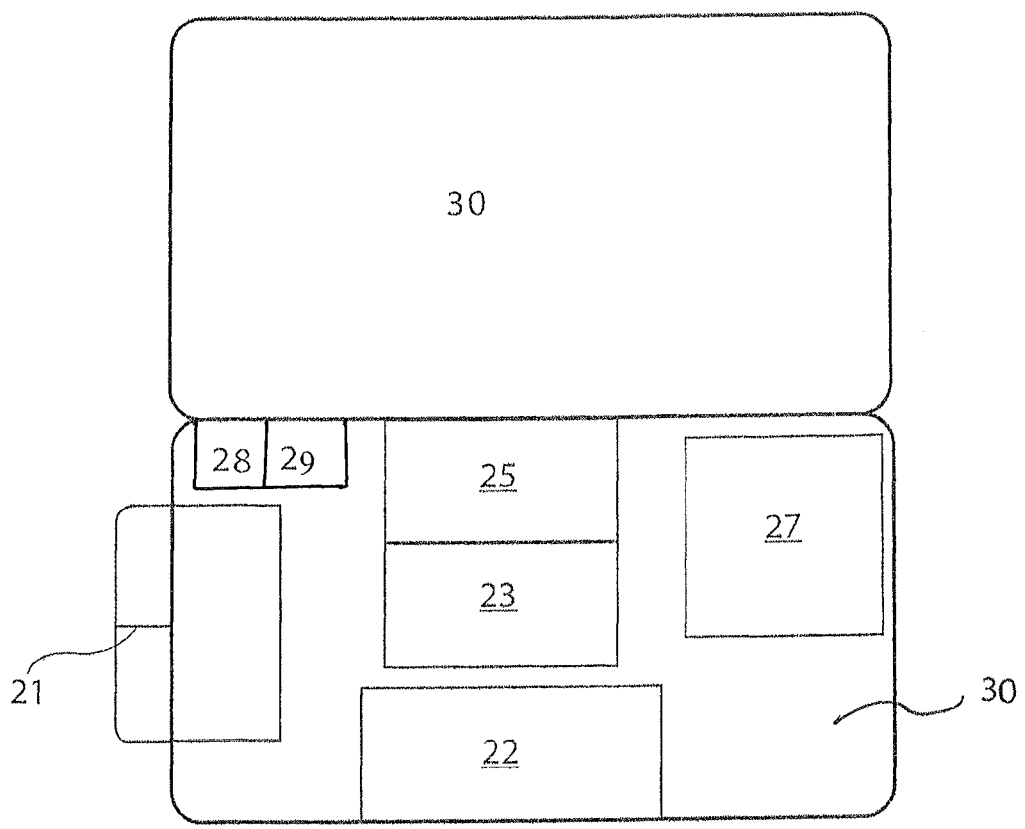
FIG. 3 is an illustration of the contents of the hardware case shown in FIG. 2.

Referring to FIGS. 1-3, the present invention provides a portable surveillance system 1 for rapid deployment, comprising a hardware case 2 containing a battery, a microprocessor, data storage and communications equipment; a stand which preferably comprises a tripod 3 for quick erection in a desired location, and a surveillance camera 4 and optional microphone or sound pick-up 34 attached at the top of the tripod.

Referring to FIG. 2, the hardware case 2 is intended to protect the internal hardware from adverse environmental conditions. The hardware case also may provide protection from damage that would occur if the case were dropped or were otherwise subjected to physical damage. The case preferably is constructed of molded plastic with a latching mechanism and handle 24. The case should be large enough to encompass all of the hardware but small enough to be handled by a single operator.

The hardware case preferably includes a temperature control system for ensuring that the hardware is not subjected to adverse conditions. The temperature control system preferably includes intake and exhaust fans 21 and may also include an electric cooling unit 28 (FIG. 3) and/or heating unit 29 (FIG. 3) depending on the intended use. The case also may include heat-radiating fins 20. The hardware should be arranged within the case in such a way as to optimize the effectiveness of the fans, cooling unit 28, and/or heating unit 29. The hardware case may be insulated (FIG. 3, insulating layer 30) to further the effectiveness of the temperature control system. Preferably, the temperature control system is capable of creating an acceptable internal temperature under outside conditions ranging from, e.g. 0° C. to 60° C. The hardware case also should protect the interior from moisture, e.g. rain and snow, and high humidity build-up. This effective temperature range may be significantly expanded with the effective use of alternative electric heating and cooling features.

The tripod 3 should be constructed of lightweight durable materials and be able to support the weight of the camera and associated hardware and batteries, etc. The legs are individually adjustable to allow setup on virtually any terrain. The hardware case should be suspended from the apex of the tripod by vertical member 32 which attached to the case or the handle 24 of the case. Alternatively, the hardware case could rest on the ground underneath the tripod. The camera is positioned using camera mount 42, attached atop the tripod 3. The mount and vertical member could comprise a single piece, which would increase the stability of the camera and tripod and allow the connection between the camera and the hardware case to be contained inside the vertical member/camera mount. An antenna 28 may also be attached to camera mount 42 to facilitate the communications function of the surveillance system.

Referring to FIG. 3, the hardware contained in hardware case 2 comprises a network video recorder (NVR) and audio recorder, and includes a processor 22, hard disk drive (HDD) 23, battery 25, communications equipment 27, and any other necessary hardware as well as the temperature control system discussed above. The processor, or microprocessor, should be capable of running various operating systems for ease of interfacing with other surveillance systems. The HDD should be hot swappable for maximum utility.

The communications equipment of the present invention may include several options, such as for example, cellular, EVDO, wireless MESH node, point to point, point to multipoint, satellite, and Mesh WiFi. The communications capabilities of the present invention will allow the system to connect to cellular networks, where available or to connect to locally available wireless networks. In combination with the use of the hardware case and tripod, maximizes the portability of the present invention.

It should be emphasized that the above-described embodiments of the present device and process, particularly, and "preferred" embodiments, are merely possible examples of implementations and merely set forth for a clear understanding of the principles of the invention. Many different embodiments of the rapid deployment surveillance system described herein may be designed and/or fabricated without departing from the spirit and scope of the invention. For example, the surveillance system may be further equipped with a GPS device to determine the position of the installation. All these and other such modifications and variations are intended to be included herein within the scope of this disclosure and protected by the following claims. Therefore the scope of the invention is not intended to be limited except as indicated in the appended claims.

The invention claimed is:

1. A portable security system for rapid deployment, comprising:
    a surveillance camera;
    a hardware case including a carrying handle, and containing a battery, a processor, a hard disk drive, and a communication device all within the hardware case; and
    a tripod including a camera mount for supporting the camera atop the tripod, and a fixture for supporting the hardware case on the tripod below the camera, wherein the system is capable of being carried by a single person, and wherein an electrical connection between the camera and the hardware case is contained within the fixture.

2. The system of claim 1, wherein the hardware case is weatherproof and includes intake and exhaust fans.

3. The system of claim 2, wherein the hardware case further includes an electric cooling unit.

4. The system of claim 2, wherein the hardware case further includes an electric heating unit.

5. The system of claim 2, wherein the hardware case further comprises an insulating layer.

6. The system of claim 1, wherein the camera mount includes a vertical member for attaching the camera above the apex of the tripod, and wherein the fixture for supporting the hardware case is located below the apex of the tripod.

7. The system of claim 1, wherein the communication device includes equipment for communicating according to one or more protocols selected from a group consisting of: cellular, EVDO, mesh wireless node, point to point, point to multipoint, satellite, and WiFi.

8. The system of claim 1, further including one or more sound pick-up devices.

9. The system of claim 1, wherein the hardware case further includes heat radiating fins.

10. The system of claim 1, wherein the fixture is attachable to the handle of the hardware case such that the hardware case, when attached to the fixture, is suspended from the apex of the tripod.

\* \* \* \* \*